(12) United States Patent
Huang et al.

(10) Patent No.: US 11,331,840 B2
(45) Date of Patent: May 17, 2022

(54) LAMINATION FORMING SYSTEM

(71) Applicants: National Kaohsiung University of Science and Technology, Kaohsiung (TW); FORMOSA PLASTICS CORPORATION, Kaohsiung (TW)

(72) Inventors: Chung-Ching Huang, Kaohsiung (TW); Te-Wen Lee, Kaohsiung (TW); Jen-Long Wu, Kaohsiung (TW); Wen-Hao Kang, Kaohsiung (TW); Ying-Cheng Weng, Kaohsiung (TW)

(73) Assignees: FORMOSA PLASTICS CORPORATION, Kaohsiung (TW); NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 291 days.

(21) Appl. No.: 16/396,081

(22) Filed: Apr. 26, 2019

(65) Prior Publication Data
US 2020/0338798 A1   Oct. 29, 2020

(51) Int. Cl.
*B29C 48/05* (2019.01)
*B29C 48/92* (2019.01)
*B29C 48/32* (2019.01)
*B29C 48/30* (2019.01)

(52) U.S. Cl.
CPC .......... *B29C 48/05* (2019.02); *B29C 48/3001* (2019.02); *B29C 48/32* (2019.02); *B29C 48/92* (2019.02)

(58) Field of Classification Search
CPC ..... B29C 48/05; B29C 48/3001; B29C 48/32; B29C 48/92; B29C 2948/926; B29C 48/266
See application file for complete search history.

(56) References Cited

U.S. PATENT DOCUMENTS 3,819,292 A * 6/1974 Wentworth ............. B29C 48/92
                                                    415/150
10,201,503 B1 * 2/2019 Li ......................... B33Y 30/00

* cited by examiner

*Primary Examiner* — Robert J Grun
(74) *Attorney, Agent, or Firm* — Muncy, Geissler, Olds & Lowe, P.C.

(57) ABSTRACT

A lamination forming system includes a melt extruder, a nozzle head and a carrier unit. The melt extruder is configured to melt a plastic raw material into a plastic melt and to deliver the same. The nozzle head includes a sprue channel that has an inlet connected to the melt extruder for entry of the melt plastic into the sprue channel, and an outlet disposed distally from the inlet to deliver the plastic melt from the sprue channel. The carrier unit includes a slide table controllable to move relative to the nozzle head. The slide table is configure to carry the plastic melt outputted from the nozzle head.

2 Claims, 3 Drawing Sheets

LAMINATION FORMING SYSTEM

FIELD

The disclosure relates to a forming system, and more particularly to a lamination forming system by using directly a plastic sheet, plastic powder, or plastic particles as a plastic raw material.

BACKGROUND

In order for forming laminations, an existing lamination forming system usually utilizes a plastic wire material that is pre-formed for use as a raw material. Such a plastic wire material is not as common as particulate or granular plastic materials, which are major raw materials in processing plastics. Generally, the plastic wire material is produced by processing a particulate or granular plastic material through intricate steps. Besides, not all kinds of plastic particles or granules can be processed into plastic wires. Therefore, applications of the existing lamination forming system are limited by the plastic wire materials.

SUMMARY

Therefore, an object of the disclosure is to provide a lamination forming system that can alleviate the drawback of the prior art.

According to the disclosure, a lamination forming system includes a melt extruder, a nozzle unit and a carrier unit.

The melt extruder is configured to melt a plastic raw material, such as a plastic sheet, plastic powder, or plastic particles, into a plastic melt and to deliver the same.

The nozzle unit includes a nozzle head including a sprue channel that has an inlet connected proximally to the melt extruder for entry of the melt plastic into the sprue channel, and an outlet disposed distally from the inlet to deliver the plastic melt from the sprue channel.

The carrier unit includes a slide table controllable to move relative to the nozzle head. The slide table is configured to carry the plastic melt outputted from the outlet of the nozzle head.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
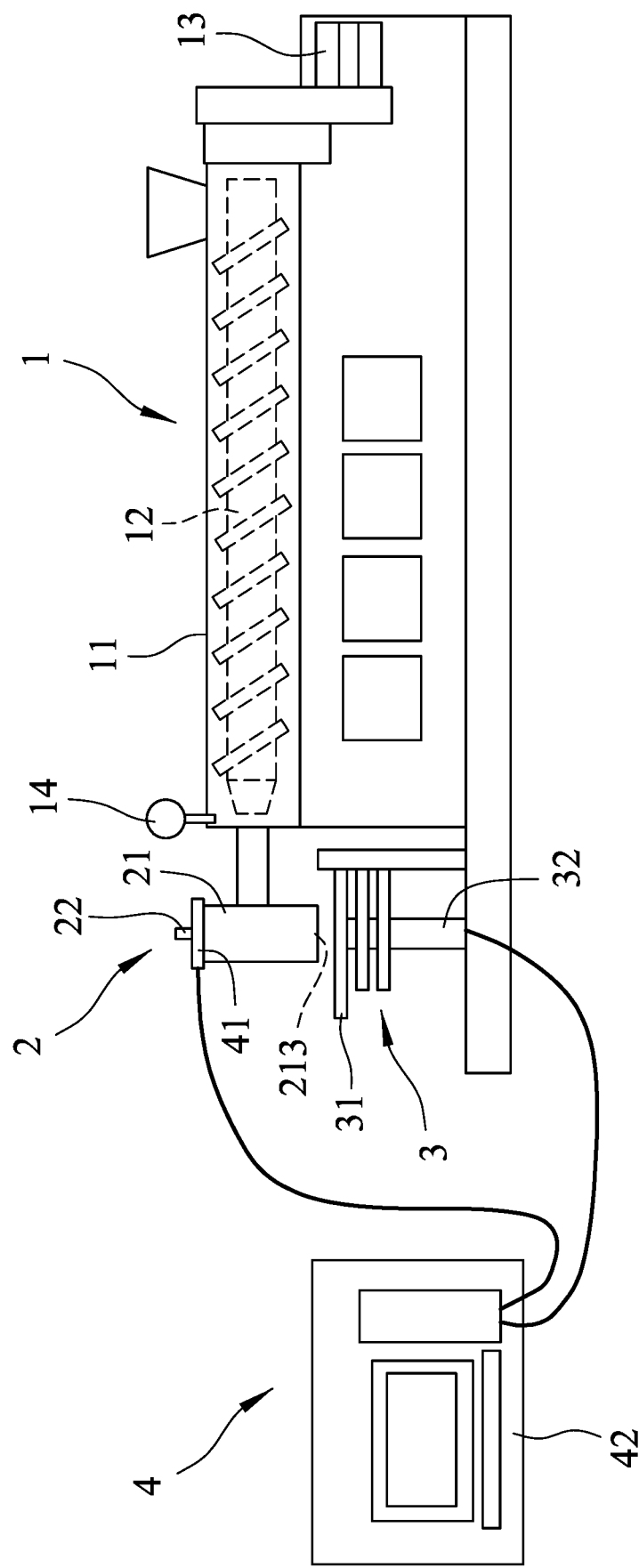
FIG. 1 is a schematic view illustrating an embodiment of a lamination forming system according to the disclosure.
Figure 2:
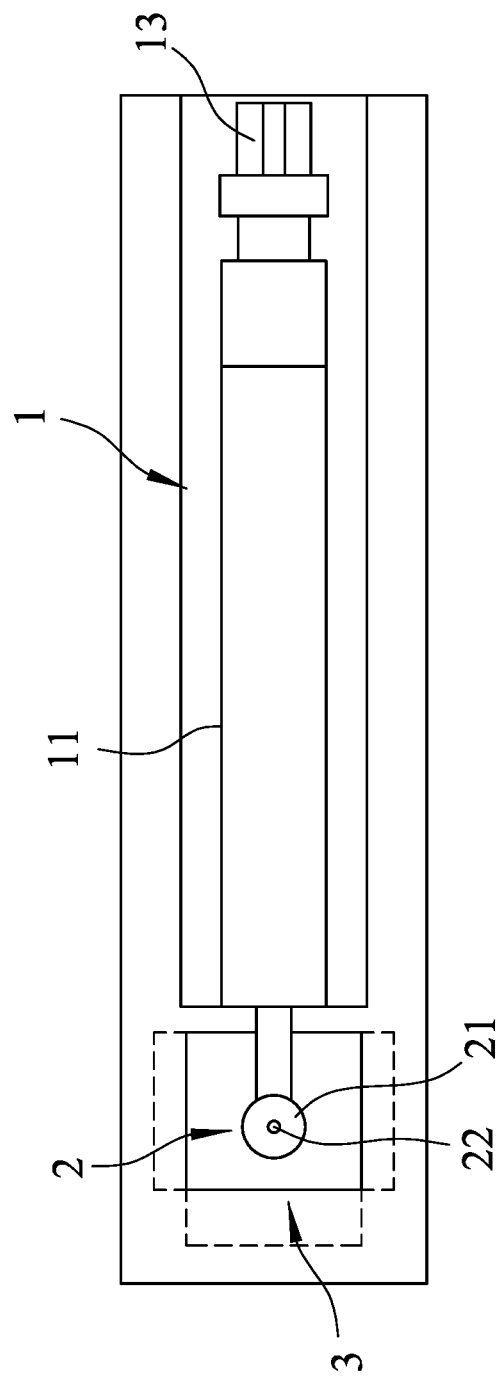
FIG. 2 is a top view of the embodiment.
Figure 3:
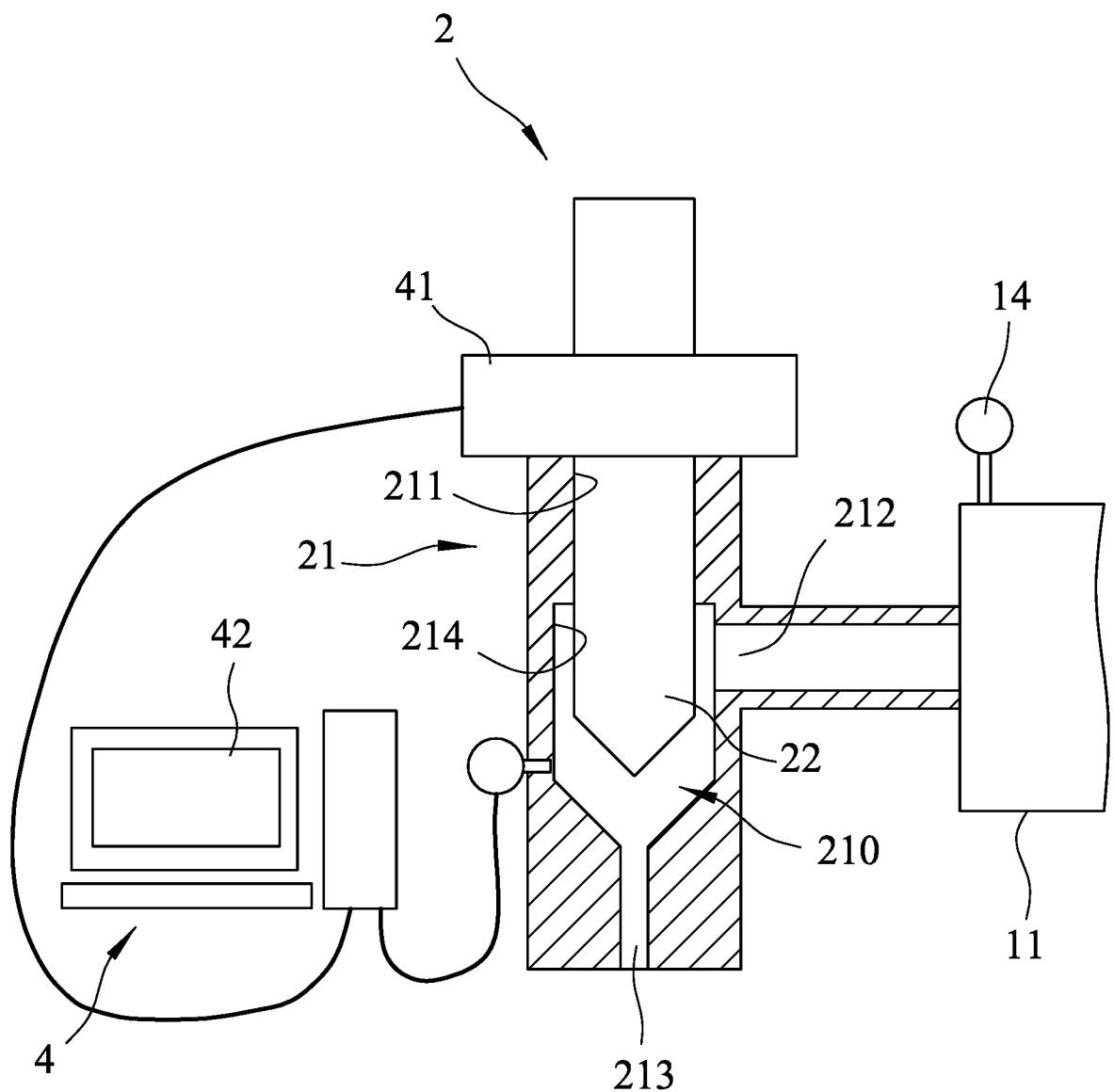
FIG. 3 is an enlarged fragmentary sectional view of the embodiment illustrating a nozzle unit of the lamination forming system.

FIGS. 1 to 3 illustrate an embodiment of a lamination forming system according to the disclosure. The lamination forming system of the disclosure includes a melt extruder 1, a nozzle unit 2, a carrier unit 3 and a control unit 4.

The melt extruder 1 includes a feed barrel 11 having a controlled temperature, a screw shaft 12 rotatably disposed within and extending axially along the feed barrel 11, a drive module 13 driving rotation of the screw shaft 12, and a pressure sensor 14 detecting pressure inside the feed barrel 11. The feed barrel 11 melts a plastic raw material, such as a plastic sheet, plastic powder, or plastic particles, into a plastic melt. The screw shaft 12 is rotated by the drive module 13 to extrude the plastic melt from the feed barrel 11. A temperature of the feed barrel 11 is controlled by a digital proportion-integral-derivative temperature controller. Pressure inside the feed barrel 11 is controlled by monitoring the pressure with the pressure sensor 14 and by controlling rotation speed of the screw shaft 12. The rotation speed of the screw shaft 12 ranges from 1 to 36 rpm. An extrudate rate of the screw shaft 12 ranges from 0.12 to 4 kg/hr. The drive module 13 is a feedback motor of 750W that controls the rotation speed of the screw shaft 12.

The nozzle unit 2 includes a nozzle head 21 and a valve needle 22. The feed barrel 11 is connected to the nozzle head 21. The nozzle head 21 includes a sprue channel 210 and a valve passage 211. The sprue channel 210 has an inlet 212 connected proximally to the feed barrel 11 of the melt extruder 1 for entry of the melt plastic into the sprue channel 210, an outlet 213 disposed distally from the inlet 212 to deliver the plastic melt from the sprue channel 210, and a controlled sprue region 214 communicating the inlet 212 and the outlet 213 to receive the plastic melt. The outlet 213 is connected to a bottom of the controlled sprue region 214. The inlet 212 is located at one side of the controlled sprue region 214 between the top and bottom of the controlled sprue region 214. The bottom of the controlled sprue region 214 has a sprue tapered end connected to the outlet 213. The valve passage 211 is connected to a top of the controlled sprue region 214 and is smaller in cross section than the controlled sprue region 214. The valve needle 22 extends downwardly through the valve passage 211 into the controlled sprue region 214. The valve needle 22 is controllable to move within the controlled sprue region 214 so as to vary an amount of the plastic melt delivered from the outlet 213. In addition, the valve needle 22 has a needle tapered end movable in a direction toward or away from the sprue tapered end of the controlled sprue region 214. In this embodiment, the outlet 213 has a diameter of 1 mm. The nozzle head 21 is replaceable to change the diameter of the outlet 213. The valve needle 22 is driven by a servo motor (not shown) and a screw mechanism (not shown) to be moved upwardly and downwardly relative to the nozzle head 21. The travel distance of the valve needle 22 is equal to or smaller than 5 mm.

The sprue tapered end of the controlled sprue region 214 defines a melt flow passage around the valve needle 22 to allow passage of the plastic melt into the outlet 213. The melt flow passage extends from the inlet 212 to the outlet 213. A cross-sectional area of the melt flow passage is varied when the valve needle 22 moves within the controlled sprue region 214 so that the amount of the plastic melt delivered from the outlet 213 is varied. In other words, when the needle tapered end of the valve needle 22 moves downward and toward the sprue tapered end of the controlled sprue region 214, the cross-sectional area of the melt flow passage is reduced, thereby increasing a pressure difference between the inlet and outlet 212, 213. When the needle tapered end of the valve needle 22 moves away from the sprue tapered end of the controlled sprue region 214, the pressure difference is reduced. The amount of the plastic melt delivered from the outlet 213 is varied when the pressure difference between the inlet 212 and outlet 213 is varied.

The carrier unit 3 includes a slide table 31 and a triaxial drive mechanism 32. The slide table 31 is disposed beneath the outlet 213 and controllable to move relative to the nozzle head 21. The triaxial drive mechanism 32 drives triaxial movement of the slide table 31. In this embodiment, the slide table 31 is an electrically operated table, such as a CKD ETS electric table with a size of 300×300×400 mm. The triaxial drive mechanism has a 20-bit resolution motor (not shown) and drives movement of the slide table 31 by a track chain (not shown).

The control unit 4 includes a pressure monitor control module 41 and a human interface module 42. The pressure monitor control module 41 detects pressure in the controlled sprue region 214 of the sprue channel 210, and controls movement of the valve needle 22. The human interface module 42 is electrically connected to the pressure monitor control module 41 and the triaxial drive mechanism 32. A pressure value detected by the pressure monitor control module 41 inside the sprue channel 210 is compared to a pressure value detected by the pressure sensor 14 in the feed barrel 11 so as to obtain a pressure difference between the inlet 212 and the outlet 213. By controlling the pressure difference between the inlet 212 and the outlet 213, the amount of the plastic melt delivered from the outlet 213 is controlled.

Because the melt extruder 1 can directly melt a common plastic raw material, such as a plate-shaped, powdered, or granular plastic material to form the plastic melt, no plastic wire is needed to be pre-formed for use as a starting material for lamination. Thus, the raw material usable for the lamination forming system need not be limited to particular plastics.

The amount of the plastic melt delivered from the outlet 213 is controlled by controlling the position of the needle tapered end of the valve needle 22 relative to the sprue tapered end of the controlled sprue region 214. The slide table 31 carries the plastic melt outputted from the nozzle head 21, and is driven by the triaxial drive mechanism 32 to move relative to the nozzle unit 2 according to the input data, so that a product with a desired profile is formed from the plastic melt on the slide table 31.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A lamination forming system, comprising:
a melt extruder configured to melt a plastic raw material, such as a plastic sheet, plastic powder, or plastic particles, into a plastic melt and to deliver the same; a nozzle unit including a nozzle head including a sprue channel that has an inlet connected proximally to said melt extruder for entry of the melt plastic into said sprue channel, and an outlet disposed distally from said inlet to deliver the plastic melt from said sprue channel; and a carrier unit including a slide table controllable to move relative to said nozzle head, said slide table being configured to carry the plastic melt outputted from said outlet of said nozzle head; wherein said sprue channel further has a controlled sprue region communicating said inlet and said outlet to receive the plastic melt, said outlet connected to a bottom of said controlled sprue region, said nozzle head further having a valve passage that is connected to a top of said controlled sprue region and that is smaller in cross section than said controlled sprue region, said inlet being located at one side of said controlled sprue region between said top and bottom of said controlled sprue region, said nozzle unit further including a valve needle extending downwardly through said valve passage into said controlled sprue region, said controlled sprue region defining a melt flow passage that is formed around said valve needle and that extends from said inlet to said outlet, said valve needle being controllable to move upward or downward within said controlled sprue region, a cross sectional area of said melt flow passage being varied when said valve needle moves upward or downward; wherein said melt extruder includes a feed barrel having a controlled temperature and connected to said inlet of said nozzle head, a screw shaft rotatably disposed within and extending axially along said feed barrel, and a drive module driving rotation of said screw shaft to extrude the plastic melt from said feed barrel; wherein said melt extruder further includes a pressure sensor configured to detect a pressure in said feed barrel, said lamination forming system further including a pressure monitor control module that is configured to detect pressure in said controlled sprue region of said sprue channel and configured to control movement of said valve needle; wherein said lamination forming system further includes a human interface module electrically connected to said pressure monitor control module; wherein said pressure monitor control module is configured to compare a pressure value inside said sprue channel to a pressure value detected by said pressure sensor in said feed barrel so as to obtain a pressure difference between said inlet and said outlet, and further configured to control an amount of the plastic melt delivered from said outlet by controlling said pressure difference between said inlet and said outlet; wherein said carrier unit further includes a triaxial drive mechanism configured to drive movement of said slide table, said human interface module being electrically connected to said triaxial drive mechanism.

2. The lamination forming system as claimed in claim 1, wherein said bottom of said controlled sprue region has a sprue tapered portion connected to said outlet, a top end of said sprue tapered portion being disposed between said inlet and said outlet, said valve needle having a needle tapered end movable in a direction toward or away from said sprue tapered end.

* * * * *